United States Patent [19]

Heyl

[11] Patent Number: 4,889,452

[45] Date of Patent: Dec. 26, 1989

[54] VENTED PRODUCT PUMP AND AIR FILTER ARRANGEMENT

[75] Inventor: Robert D. Heyl, Williamsport, Pa.

[73] Assignee: The Young Industries, Inc., Muncy, Pa.

[21] Appl. No.: 318,434

[22] Filed: Feb. 28, 1989

Related U.S. Application Data

[60] Continuation of Ser. No. 150,454, Jan. 29, 1988, abandoned, which is a continuation of Ser. No. 881,249, Jul. 2, 1986, abandoned, which is a division of Ser. No. 775,241, Sep. 12, 1985, abandoned, which is a continuation-in-part of Ser. No. 727,071, Apr. 25, 1985, abandoned.

[51] Int. Cl.[4] ............... B65G 53/66; B65G 53/46; B65G 53/60

[52] U.S. Cl. ........................... 406/85; 406/109; 406/121; 406/122; 406/130; 406/171

[58] Field of Search ............ 406/171, 172, 109, 124, 406/125, 126, 144, 94, 96, 98, 10, 12, 28, 29, 50, 85, 121, 122, 127, 128, 130, 131, 145, 151, 153

[56] References Cited

U.S. PATENT DOCUMENTS

| | | | |
|---|---|---|---|
| 1,385,870 | 7/1921 | Gieseler | 406/171 X |
| 1,669,635 | 5/1928 | Thomas | 406/121 X |
| 2,734,782 | 2/1956 | Galle | 406/144 X |
| 2,907,606 | 10/1959 | Caldwell | 406/125 |
| 3,069,205 | 12/1962 | McIver | 406/109 X |
| 3,233,945 | 2/1966 | Kurtz | 406/127 X |
| 3,424,501 | 1/1969 | Young | 406/171 X |
| 3,489,464 | 1/1970 | Delfs | 406/109 X |
| 4,009,912 | 3/1977 | Mraz | 406/144 |
| 4,061,401 | 12/1977 | Brown | 406/50 X |
| 4,073,244 | 2/1978 | Snowdon | 406/85 X |

FOREIGN PATENT DOCUMENTS

| | | | |
|---|---|---|---|
| 559239 | 9/1932 | Austria | 406/125 |
| 2043005 | 3/1972 | Fed. Rep. of Germany | 406/125 |
| 2334360 | 1/1975 | Fed. Rep. of Germany | 406/12 |
| 0218755 | 2/1985 | Fed. Rep. of Germany | 406/122 |
| 371326 | 6/1973 | U.S.S.R. | 406/94 |

Primary Examiner—Joseph F. Peters, Jr.
Assistant Examiner—James M. Kannofsky
Attorney, Agent, or Firm—Lalos & Keegan

[57] ABSTRACT

An apparatus for handling communited materials including a material hopper defining a zone into which the material may be deposited, a filter device having an inlet communicating with the material depositing zone, a pump defining a chamber for receiving material from the hopper, a valve for controlling the supply of material from the hopper to the pump chamber, a device for injecting fluid under pressure into the pump chamber to flush material disposed therein through a pump outlet, a valve for controlling the supply of fluid into the pump chamber, a venting conduit intercommunicating the pump chamber and the inlet of the filter device, and a valve for controlling the flow of fluid through the venting conduit.

8 Claims, 6 Drawing Sheets

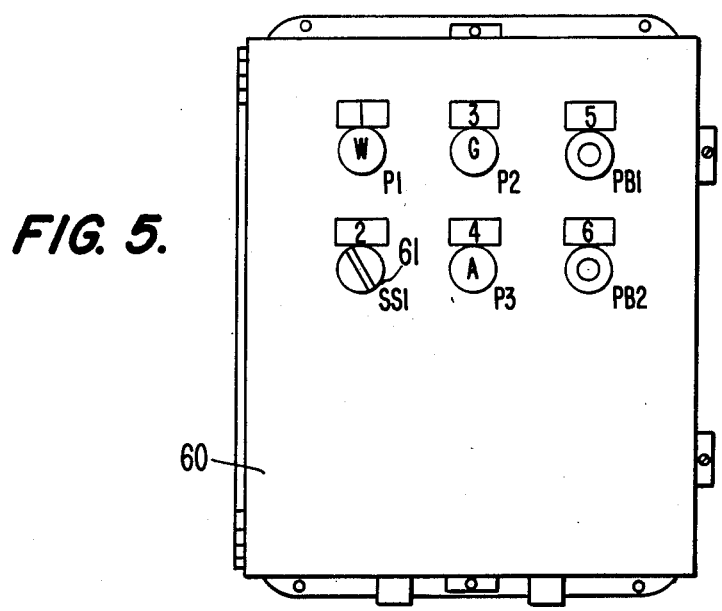
FIG. 5.
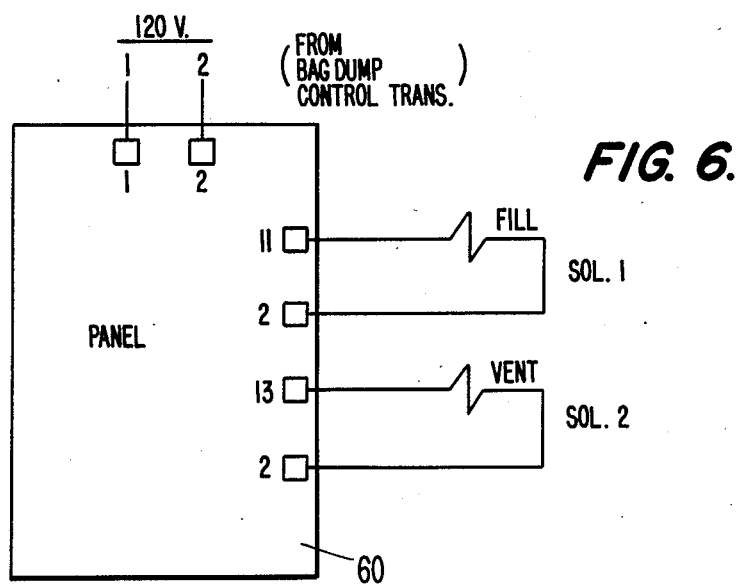
FIG. 6.
FIG. 7.
| 1 | POWER ON | 4 | CONVEYING |
|---|---|---|---|
| 2 | PANEL OFF<br>MAN.   AUTO. | 5 | MANUAL FILL |
| 3 | FILLING | 6 | MANUAL CONVEY |

VENTED PRODUCT PUMP AND AIR FILTER ARRANGEMENT

CROSS-REFERENCE TO RELATED APPLICATION

The present application is a continuation of application Ser. No. 150,454, filed Jan. 29, 1988, now abandoned, which is a continuation of application Ser. No. 881,249, filed July 2, 1986, now abandoned, which is a divisional of application Ser. No. 775,241, filed Sept. 12, 1985, now abandoned, which is a continuation-in-part of application Ser. No. 727,071, filed Apr. 25, 1985, now abandoned.

BACKGROUND OF THE INVENTION

1. Field of the Invention

This invention relates to a dust-free, vented product pump arrangement including apparatus for receiving particulate matter from a container by which the matter was transported and filtering from the ambient atmosphere dust particles produced by transfer of the particulate matter to the receiving apparatus and pump system for moving the product from the discharge of the product receiver to one or more collecting points, said system including a dense-phase, positive-pressure, pneumatic conveying pump. The invention more particularly relates to dust-free pump arrangements which may be used to discharge dry, free-flowing particulate materials into pressurized vessels or into liquids that have a high system back pressure. The invention also relates to pump assemblies which can be used to convey products that are normally dusty, light and fluffy or otherwise have poor flow and handling characteristics.

2. Description of the Prior Art

Small quick cycling product pumps have frequently been used as a means of introducing product into a pneumatic conveying line. Each successive cycle of such pump pushed a new charge of product into the conveying line and the gas trapped between each charge pushed the previously-loaded charge further along the conveying line. These devices were normally cycled with electric or pneumatic controls incorporating adjustable timing devices. The timers were arranged to vary the time of each function within the cycle so that the system could be adjusted to meet varying field conditions. The cycle started with the product inlet valve open and the product flowed by gravity from the hopper, or the like, into the product pump. After a short fill time, the product inlet valve was closed and pressure was applied to the pump chamber to pneumatically force the product charge from the pump into the conveying line. After the pressure source was shut off, pressure remained in the product pump and in the conveying line. Some of this pressure was dissipated through the product charge opening and through the discharge of the conveying system providing a sufficient delay time was employed between the shut off of the pressure source and the opening of the product inlet valve. In actual practice, a delay time was selected to permit some pressure to bleed off through the discharge lines with the remaining pressure discharging into the incoming product when the inlet valve was opened. Both the time required to bleed off the pressure and the blow back through the inlet caused a reduction in the overall delivery rate of the pneumatic conveying system. Manifestly, the higher the back pressure at the discharge of the system the greater the bleed off problem. Also, a high rate of blow back at the inlet feed point often caused a dust problem. It is further noted that the prior art systems often could not be used to transport solids to a highly pressurized vessel or into a liquid where there was a large hydraulic back pressure.

Another ever increasing problem in today's industrial environment has occurred in the handling of particulate materials which are capable of producing airborne dust. This problem is particularly acute when it is necessary to transfer dusty materials from, for example, a transport container, to processing machinery. The dust produced during this operation is well known to constitute a hazard to human health, as well as in some circumstances creating other risks such as producing an explosive atmosphere. Due to these risks, numerous laws have been enacted to require industries handling such materials to remove significant portions of this dust from the air, and the stringent nature of these laws have created the need for effective and efficient filtering mechanisms.

From an economic viewpoint, these filtering mechanisms also assume importance in that the airborne dust is a recoverable portion of the particulate material in question. Accordingly, in addition to the significance of environmental and legal requirements for dust recovery, recovery of dust particles assumes importance in the prevention of economic loss arising out of loss of raw materials in the form of dust particles.

SUMMARY OF THE INVENTION

An object of this invention is to provide apparatus for receiving and transporting particulate matter and for filtering and collecting airborne dust particles produced by transfer of such particulate matter in a completely self-contained, integral device.

Another object is to provide apparatus for receiving and transporting particulate matter and for filtering and collecting the airborne dust particles so produced, thus reducing the need for auxiliary ducting and filtering equipment and for further handling of filtered and collected material.

A further object of the invention is to provide apparatus for efficiently returning airborne dust particles to the particulate material from which those particles emanated without waste or further contamination of the environment.

A further object of the present invention is to provide an improved dense-phase positive pressure pneumatic-conveying means for moving product from the dust-free storage container to a collecting point.

Another object of the present invention is to provide a novel conveying system which can effectively convey products that are light and fluffy or otherwise have poor flow characteristics, without contaminating the surrounding environment with dust particles.

A further object of the present invention is to provide a novel system that uses pressurized gas to charge the product into a high pressurized vessel or into a liquid having a high system back pressure.

A still further object of the present invention is to provide a novel conveying system which eliminates or minimizes the dust problems previously experienced.

A further object is to provide a novel, efficient product pump system which has an adequate filling of the product chamber and improved conveying cycling rate.

A further object is to provide an improved pneumatic pump having superior product delivery rates.

A still further object is to provide a novel pump system with excellent efficiencies for pumping a variety of products.

Another object is to provide an improved pump which has excellent pumping efficiency for a variety of system piping arrangements.

A further object is to provide a novel pump assembly which can be readily adjusted to insure peak delivery efficiency.

A still further object is to provide an improved pump system which completely discharges the product out of the pressure pot or chamber without leaving a heel of material in the chamber.

A still further object is to provide an improved compressed gas pump which efficiently delivers light and/or fluffy dry free-flowing products.

Yet another object of the invention is to provide a vented product pump arrangement wherein the product pump is vented into the filtering compartment of the bag dump station which is used to feed material into the pump whereby the environment is kept free of dust, and dust particles carried by the vented gases are recovered.

Yet another object of the invention is to provide a dust free, vented pump arrangement which combines a self-contained filter dump station and a vented product pump, whereby dry, dusty, free-flowing particulate material is received and transported to a place of use without contamination of the environment with dust particles.

BRIEF DESCRIPTION OF THE DRAWINGS

FIG. 5 is a front view of the control panel for the control means of FIG. 4;

FIG. 6 is a schematic of the field wiring for the panel of FIG. 5;

FIG. 7 is a view of the engraved nameplates of the panel of FIG. 5;

DETAILED DESCRIPTION OF THE INVENTION

Figure 1:
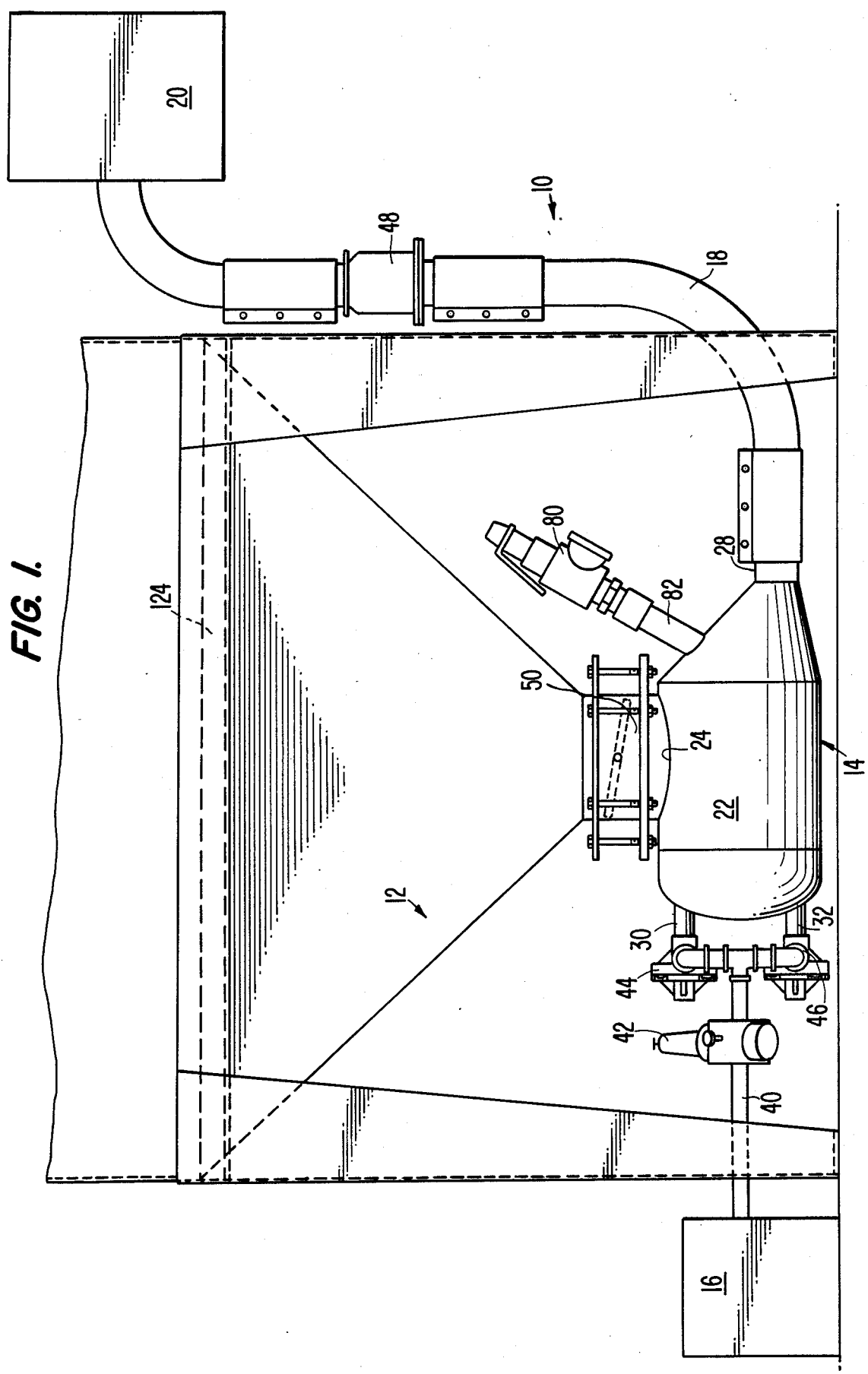
FIG. 1 is a side elevational view of a product pump system embodying the present invention.
Figure 2:
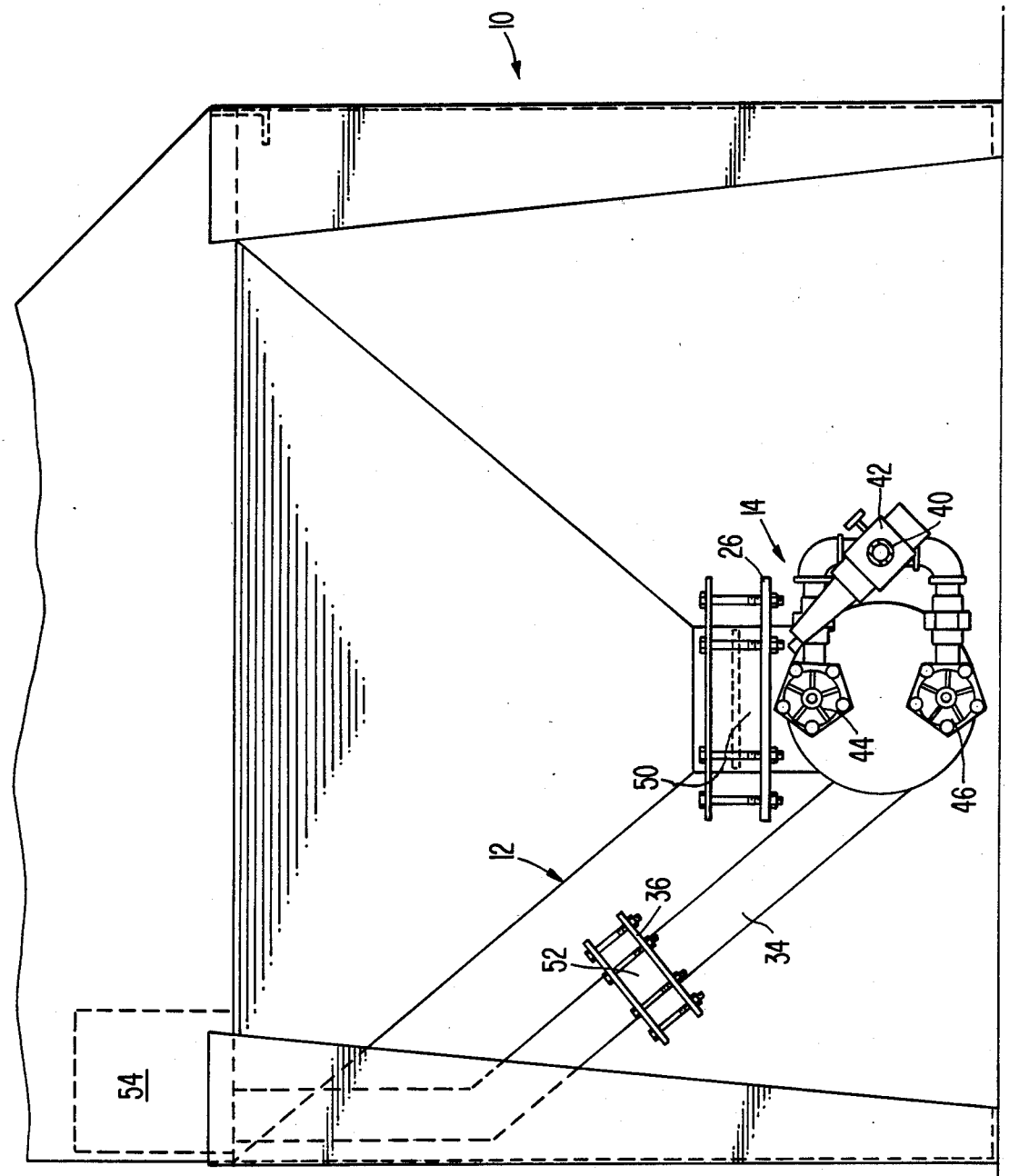
FIG. 2 is an end elevational view of the system of FIG. 1.

Referring to FIGS. 1 and 2, a product pump system embodying the present invention is illustrated generally at 10. System 10 basically includes a product source or hopper 12 leading down into a product pump 14. A compressed gas supply or source shown generally at 16 pumps compressed gas through product pump 14 via a delivery line 18 to deliver the product to a product collector 20. The compressed gas will generally be compressed air; however, it is well within the skill of the routineer in his art to substitute compressed nitrogen, inert gas, or the like. System 10 can efficiently deliver a wide range of dry free-flowing products, such as wheat flour, plastic compounds, powders, pellets, finely divided clays, etc., from hopper 12 to product collector 20.

Figure 3:
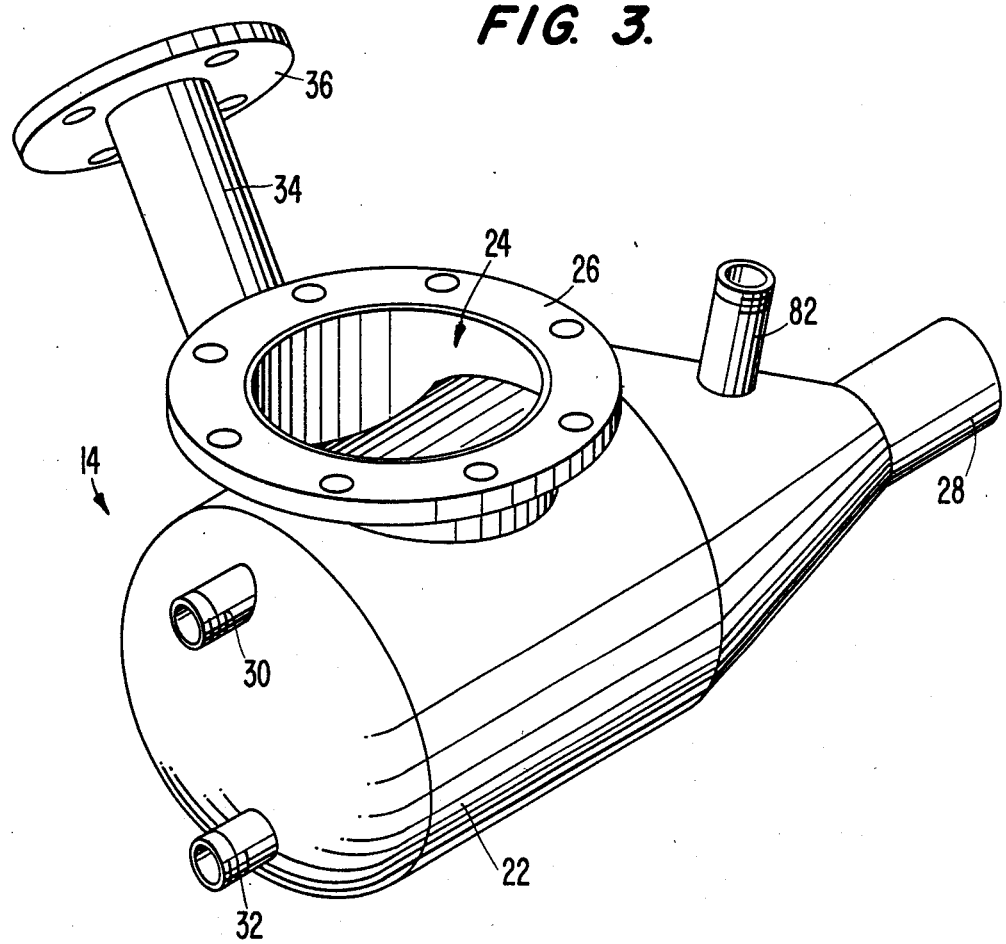
FIG. 3 is an enlarged, perspective view of the pump of the system of FIG. 1 illustrated in isolation.

Product pump 14 is best illustrated in FIG. 3 wherein it is shown in isolation. Pump 14 defines an interior product pot or chamber 22 and has a product receiving inlet 24 on its upper surface, said inlet having a mounting flange 26 thereon. At one end of the product pump 14 is the product discharge outlet 28 which is secured to and communicates directly with delivery line 18. At the opposite end of pump 14, two compressed gas inlets are provided, each communicating with compressed gas source 16. As shown, there is an upper inlet 30 and a lower inlet 32 positioned directly therebelow. A venting pipe 34 communicates with chamber 22 of product pump 14 and it also has a mounting flange 36 at its end for mounting to a venting valve 52.

The compressed gas for system 10 is supplied to the inlets from source 16, which usually will be from the compressed gas source of the system user's plant, and which typically will be at a pressure of sixty to one hundred and twenty psi. The gas is supplied through a supply line 40 to the pressure regulator 42 where the pressure is dropped to the pump operating pressure of about twenty to sixty pounds, or so, and held there. Manifestly heavier products and longer conveying distances may require the greater pressures.

From the regulator, compressed gas flows to solenoid valves 44, 46, which control the flow of the compressed gas into upper and lower inlets 30, 32. As will later be described more fully, valves 44, 46 are opened and closed together so that the compressed gas may pass through both of the inlets 30, 32 into the chamber 22 at the same time. However, it is also within the scope of the invention to have upper inlet 30 open before lower inlet 32.

Upper inlet 30 enters product chamber 22 at an upper location such that the pressurized gas exiting therefrom will impact the upper portion of the product when chamber 22 is full. The compressed gas from upper inlet 30 also pressurizes the entire chamber 22 and thereby forces the product out through product discharge outlet 28. Lower inlet 32, on the other hand, is positioned generally adjacent the floor of product chamber 22 so that compressed gas passing therethrough will sweep the product across the floor out through product discharge outlet 28, thereby preventing a heel of material from being left in chamber 22 at the end of the cycle. Thus, this novel dual inlet system provides for the thorough and quick discharge of the product from product chamber 22 out through product discharge outlet 28.

The product, when forced by the compressed gas out through the product discharge outlet 28, travels through delivery line 18, past a check valve 48 and into product collector 20. Product collector 20 may comprise a liquid tank or vessel having a positive pressure exerting a back pressure through delivery line 18. To prevent the product from flowing back into product chamber 22 by the force of back pressure after valves 44, 46 have been closed, check valve 48 is provided and mounted in delivery line 18. Check valve 48 may comprise any suitable directional valving means, such valves being well known to the routineer in the applicable art.

The product is stored in a hopper 12 positioned directly over product pump 14. Hopper 12 communicates through product receiving inlet 24 with chamber 22, and product receiving inlet valve 50 controls the flow of the product into chamber 22. The product, which is generally a dry, free-flowing material and can be very light and fluffy, may flow by gravity from hopper 12 through inlet valve 50 when the latter is open and thus into chamber 22. It is also known to provide components, such as vibrators or other means to facilitate the flow of material.

Venting pipe 34 communicates with product chamber 22 and is controlled by a vent valve 52, such as a butterfly gate which has quick opening and closing characteristics, mounted on mounting flange 36. Vent valve 52 is opened after inlet valves 44 and 46 have closed and before product receiving inlet valve 50 has opened. Venting pipe 34 allows the excess pressure to drain out of chamber 22 so that compressed gas is not released suddenly through receiving inlet 24 when valve 50 is opened. As has been experienced in the past, such sudden release may create dust forming conditions and hinder the flow rate of the product into the chamber. The venting relieves the pressure in the chamber, so that gravitational flow of lighter products, and/or those with poor flow characteristics is facilitated. If vent valve 52 opens too early, product will be conveyed through vent line 34. If the venting time is set too late, then pressure will vent through product receiving inlet 24 when receiving inlet valve 50 opens.

The product delivery rate is dependent on adequately filling product chamber 22 each cycle and on the number of conveying cycles per minute. Adequate venting allows the product to flow freely into product chamber 22, thus permitting a shorter fill time. Excessive vent time, on the other hand, reduces the overall conveying rate by extending the time required for each cycle. Thus, in operation it is intended that first vent valve 52 will open, then product inlet valve 50 will open, and after filling is completed, both valves close.

Figure 10:
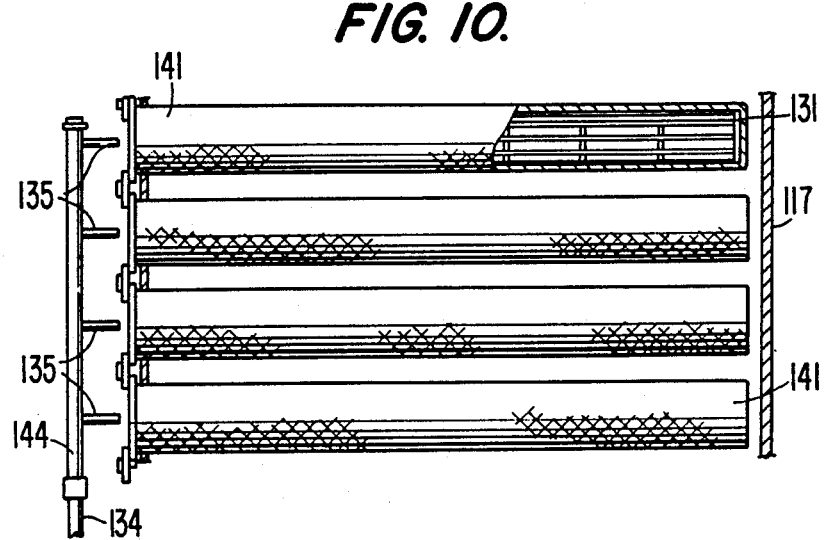
FIG. 10 is a partial elevational view of the filter with parts broken away to illustrate the filter elements and cleaning nozzles.
Figure 9:
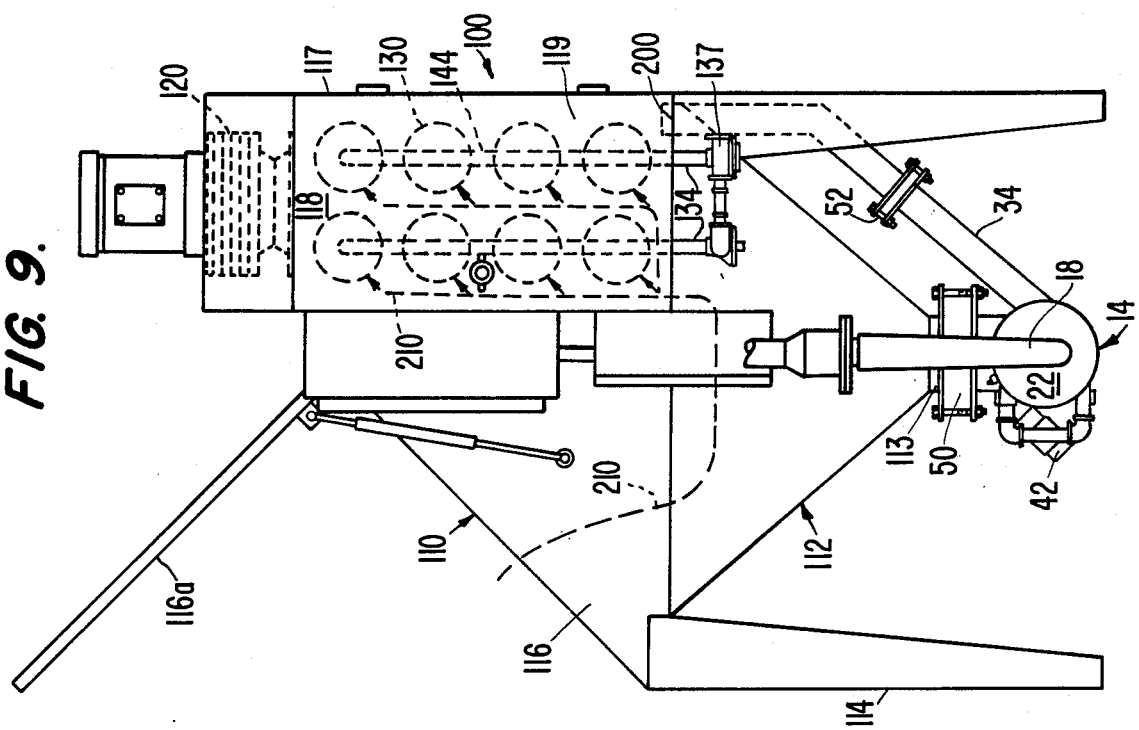
FIG. 9 is a side elevational view of the arrangement of FIG. 8 except with the loading door of the filter in its open position.
Figure 8:
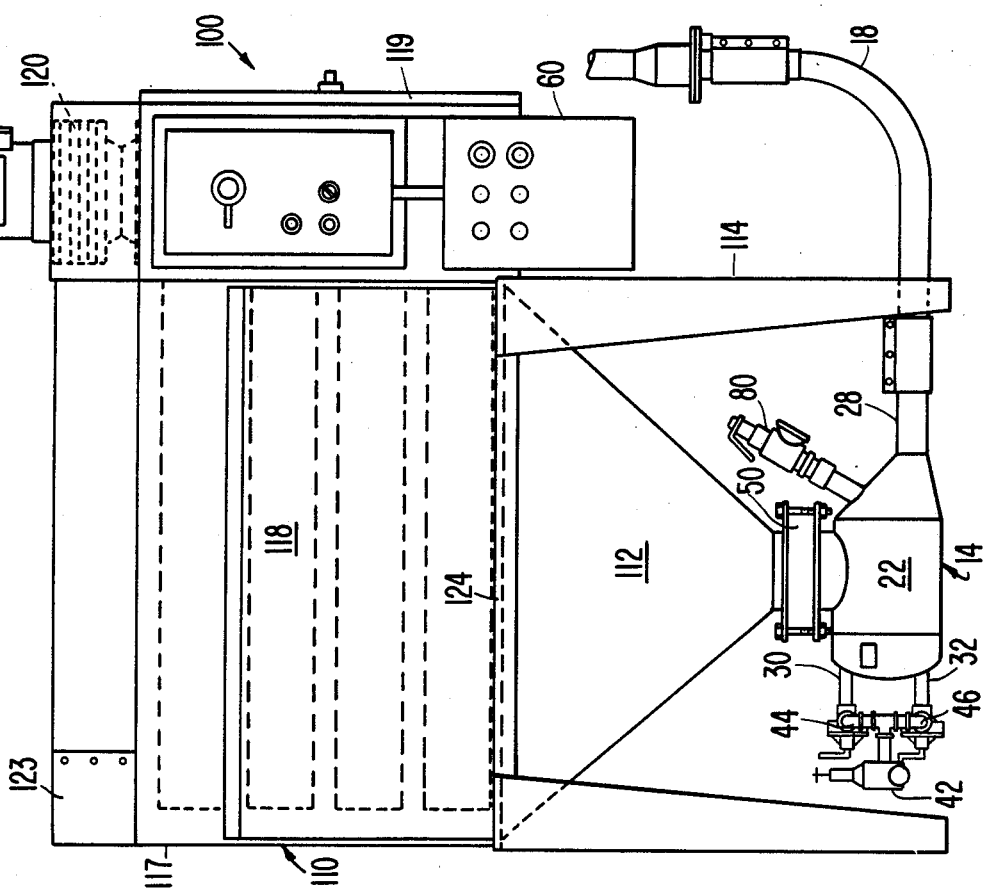
FIG. 8 is a front elevational view of a product pump/bag dump filter arrangement embodying another aspect of the present invention.

Ideally, check valve 48 might be positioned adjacent product pump 14. However, because of the presence and configuration of hopper 12, as best shown in FIG. 1, check valve 48 may need to be positioned a short distance away from chamber 22. Thus, in addition to chamber 22, the portion of delivery line 18 between check valve 48 and chamber 22 must also be vented at the end of each cycle through venting pipe 34 which vents into a suitable filtering device shown generally at 54 in FIG. 2. Filtering device 54 may be any suitable device and preferably, for purposes of one aspect of the present invention, may be of the type known as the "Self-contained Filter Bag Dump Station," manufactured by The Young Industries of Muncy, Pa. This aspect of the invention is illustrated in FIGS. 8, 9 and 10 and described hereinafter. It is also noted in this regard that when the product source is equipped with a dust collector and negative draw fan, the negative pressure will assist the venting through pipe 34 to relieve the excess pressure from product chamber 22 and thus provide additional dust control.

The system is protected against over pressure by a pressure relief valve 80 mounted on pipe 82 which communicates with the interior of pump 22.

Figure 4:
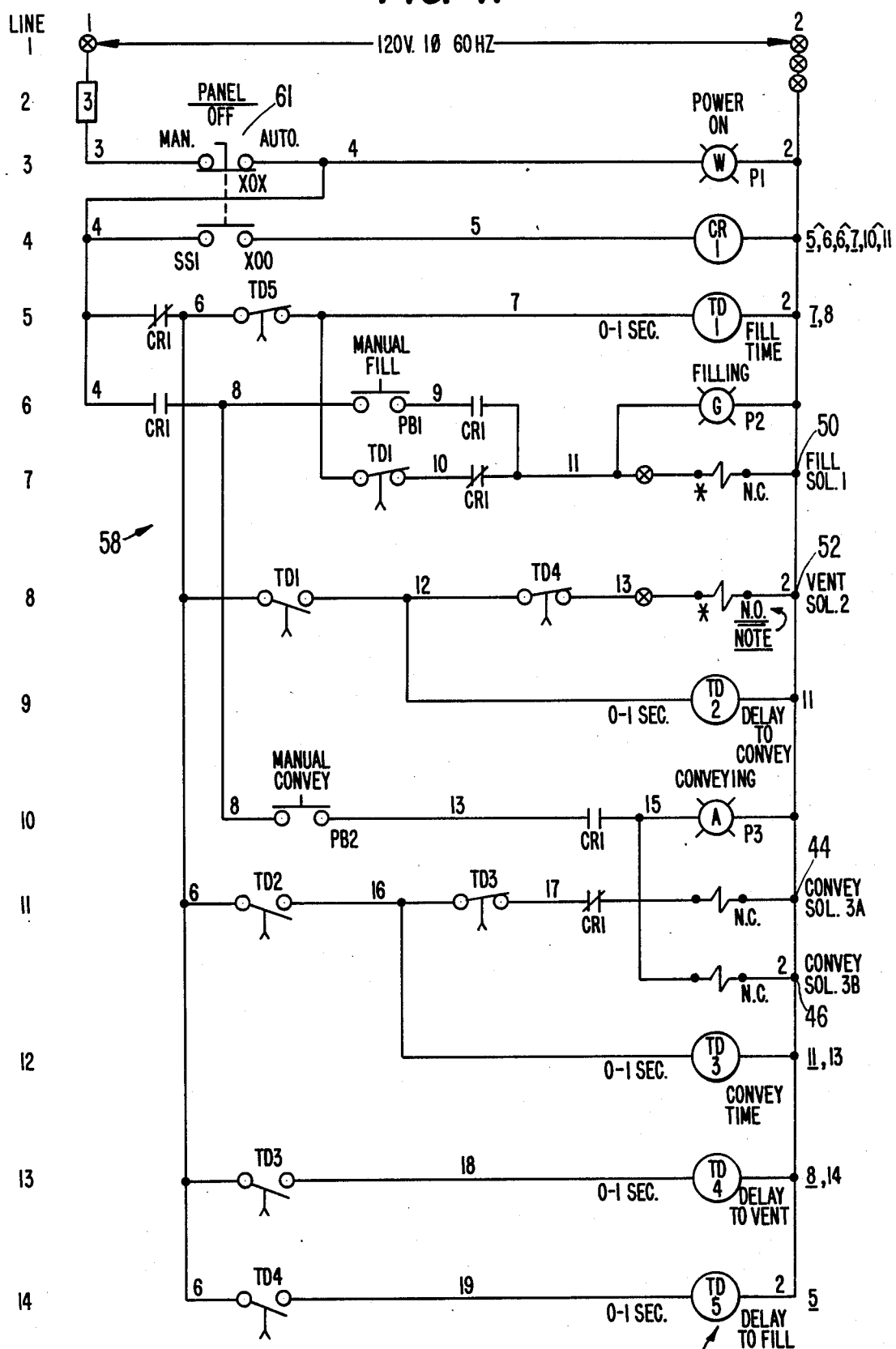
FIG. 4 is an electrical schematic of the timing control means for the product pump system of FIG. 1.

The product delivery rate of system 10 is maximized by the use of novel electrical timing means for controlling the operation of each of the valves. The wiring or timing circuit for this sequence is shown in FIG. 4, where it is designated generally by reference numeral 58. Circuit 58 is mounted in the electrical sequencing control panel 60 disposed adjacent hopper 12. The operating cycle starts when switch 61 of control panel 60 is placed in its "automatic" position. As can be seen from the description below, at this point in the cycle vent valve 52 is open, product receiving inlet valve 50 is opened, and the fill timer TDI is energized. When timer TDI times out (it has a normal setting of 0.4 to 1.0 seconds), inlet valve 50 and vent valve 52 close and the timer TD2 is energized. This timer provides a delay for opening the pressurized gas valves 44 and 46 to allow inlet valve 50 and vent valve 52 to completely close (it has a normal setting of 0.1 to 0.2 seconds). When timer TD2 times out, gas valves 44 and 46 open and conveying of the product starts and timer TD3 is energized. When timer TD3 times out (it has a normal setting of 0.3 to 0.8 seconds), pressurized gas valves 44 and 46 close and vent timer TD4 is energized. When timer TD4 times out (it has a normal setting of 0.3 to 0.5 seconds), vent valve 52 opens and timer TD5 is energized. Then when timer TD5 times out (it has a normal setting of 0.5 to 1.0 seconds), inlet valve 50 opens and the cycle is repeated until the panel "manual, off, automatic" switch 61 (as shown in FIGS. 5 and 7) is place in the "off" position. The manual position of the switch provides a means, by pressing PB1 and PB2 (as shown in FIG. 5), of manually filling and conveying the product. The manual position provides a method of purging system 10 prior to shutdown.

The sequencing timer may be either electrically or pneumatically controlled with the timing devices arranged for manual adjustment of each function of the complete cycle.

The combined use of check valve 48, venting pipe 34 with a fast acting vent valve 52, and the electrical means of precise control of timing circuit 58, makes product pumping system 10 an efficient conveying system. System 10 has a product delivery rate of at least one hundred cubic feet per hour for most products, which is generally twice that previously possible. This high system efficiency can be maintained for a wide variety of product characteristics and system piping arrangement. The sequence control further permits product pump system 10 to be easily adjusted to ensure peak efficiency.

An arrangement 100 combining the vented product pump system of the present invention with a bag dump filter, is illustrated in FIGS. 8 and 9. The bag dump filter is indicated generally by the reference number 110 and may be of the type referred to above and known as the "self-contained Filter Bag Dump Station" manufactured by the Young Industries of Muncy, Pa. Such devices are known and one such bag dump station is fully described in an application assigned to the assignee of the present application and entitled "Apparatus For Receiving Particulate Matter and Filtering and Recovering Dust Produced by Same", Ser. No. 338,252, filed Jan. 11, 1982, now abandoned.

Bag dump station 110 comprises a hopper 112 provided for receiving particulate material transferred thereto. Hopper 112 and filter assembly 118 are supported by legs 114. Hood 116 restricts cross-drafts across the face of hopper 112 and will serve to contain airborne dust particles produced by transferring the contents of a bag or the like to hopper 112. The hood 116 is provided with a door 116a for closing an opening in hood 116.

The rear portion of the illustrated station comprises a filter mechanism 118. The right-hand portion of cabinet 117 enclosing the filter mechanism is a door 119, through which access can be had to the interior or plenum of the filter mechanism for purposes of changing or cleaning filter media or other portions of the device.

A centrifugal blower 120 provides the airflow across the face of hopper 112 through filter mechanism 118, and the air is exhausted through exhaust port 123.

The face of hopper 112 is covered by a grate 124. Material is dumped into hopper 112 through grate 124 and is delivered through the discharge port 113 at the lower end of the hopper.

An inlet 137 is connected to a source of pressurized gas to provide the gas flow for performing filter cleaning functions as will be described in greater detail hereinbelow. The pressurized gas may be air, nitrogen, inert gas or the like, as is well known to those skilled in the art. A solenoid valve (not shown) allows introduction of pressurized gas through inlet 137 at selected times to clean filter mechanism 118.

Filter mechanism 118 is primarily constituted by a plurality of horizontally disposed cylindrically shaped filter elements 130. As can best be seen in FIG. 10, each filter element may be constituted by a cylindrical metal form 131, and the forms 131 are covered by a correspondingly shaped filter bag 141. Filter elements 130 are arranged in cabinet 117 so as to be readily accessible for inspection and/or removal through door 119. The elements slide longitudinally from the cabinet.

Filter bags 141 are designed to be readily removable from forms 131 so that they can be replaced when clogged or otherwise defective. Preferably, the filter bags may be of a polyester felt material. However, a wide variety of well known filter materials can be used.

As is illustrated in FIG. 10, conduits 144 (one for each bank of filters) connect a series of nozzles 135 via lines 134 to a pressurized gas inlet 137. Jets of pressurized gas are directed via inlet 137 and through nozzles 135 toward the interiors of filter elements 130 so as to back flush and thereby clean the surfaces of filter bags 141. The dust captured by the filter bags is removed from the surface thereof and is directly redeposited by gravity into hopper 112.

In operation, centrifugal blower 120 establishes a continuous pneumatic path across the face of hopper 112 down through grating 124 and into the filter mechanism 118 entirely within the structure of the described apparatus. The path of this flow is illustrated by arrow 210 in FIG. 9. The flow is exhausted to the atmosphere through exhaust port 123. When airborne, dust producing particulate material is being transferred from a bag or the like into hopper 112, the pneumatic path so established causes the dust particles to be drawn into filter mechanism 118. Larger and heavier particles will drop directly into hopper 112, and the remaining particles will be dispersed over filter elements 130. The filter bags are of a material which readily captures the dust particles, and particles accumulated on the surfaces of the filter bags and are blown off by the high-pressure gas from nozzles 135 located at the end of each bag. The dust particles blown off the surfaces of filter bags 141 are then directly redeposited by gravity into the particulate material from which it emanated in hopper 112.

The bag dump filter described above provides a means by which airborne dust, emanating from the transfer of particulate matter, can be completely and efficiently recovered in a compact, integral structure having no auxiliary or external equipment provided for that purpose. The apparatus provides for a continuous and direct pneumatic flow path by which the dust is carried from the area in which it is produced to an adjacent filtering and collection assembly within the same structure. No further handling of the collected particles is required, and there is no further opportunity for contamination of the environment.

The combination of the bag dump filter and the product pump in accordance with the concepts and principles of the present invention, is best illustrated in FIGS. 8, 9 and 10. The lower delivery end of the hopper is mounted on valve 50 and a direct vertical connection is provided to the inlet of pump 14. Also, an opening 200 is provided in the bag dump filter to facilitate connection of the vent pipe 34 from pump 14 directly into filter cabinet 117.

The purpose of the inventive combinaton of the pump 14 with filter 110 is to provide the vented product pump 14 with efficient means for receiving product from a container, such as a drum, box or bag, and introduction of the product into the product pump. Thus, the combination provides means for salvaging and recycling the dust, both from the dumped product and from the pump vent.

During the conveying cycle, product pump 14 is pressurized to force the product from the product chamber and into the conveying line. At the end of the conveying cycle, and as described above, the pressure in the pump and the conveying line must be vented before the product chamber can be refilled with product. The pressure may be vented either into the product at the product source or into a dust collecting system. However, product pumps that vent into the product will not handle light, fluffy material and the release of pressure will cause dusting when handling a powdered product.

When using a vented product pump in combination with a self-contained filter dump station in accordance with the present invention, the pump vent is coupled directly to the filter chamber by a short section of duct. This short coupling eliminates the possibility of back pressure in the pump product chamber that may occur, for example, when using an exended duct for the vent line. The continuous cleaning filter in the self-contained filter dump station, salvages the dust from the vent and returns the same to the product hopper feeding the product pump.

As set forth above, product pumps that vent the compressed gas directly into the product at the product source are limited in the products that can be handled and require additional time for venting and loading the product chamber of the pump which lowers the overall capacity of the system. The addition of a controlled vent improves the pump capacity, permits the pump to handle lighter products and eliminates the need for venting the compressed gas into the product at the product source.

Powdered products that are discharged from a container into a product pump will cause dusting that can be controlled by the addition of a dust hood around three sides of the dumping station. The dust hood requires a duct to connect to a separate dust collection system that provides a negative pressure at the dump hood to draw into the dust collecting system.

When the dust control for a dump station and product pump is not self-contained, the dust removed by the dust system is collected at a remote point and is frequently combined with the dust from other equipment. The dust collected in the remote dust collection system must be returned to the place of origin, used in another application, or discarded.

The combination of a self-contained filter dump station and a vented product pump provides an efficient means for discharging product from a container into a product pump and containing the dust within the system. The self-contained filter dump station provides a fan to create a negative pressure to draw the dust laden air from the bag dump area and from the pump vent into a dust collector which separates the dust from the air and permits clean air to be returned to the work area. Continuous cleaning of the filter media in the dust collector is accomplished by releasing a short blast of compressed gas into the filter tubes to create a reverse flow of gas through the filter media to remove the dust collected on the surface of the media. The dust that is removed from the filter media is returned to the product hopper above the product pump.

Both the self-contained filter dump station and the vented product pump incorporate independent advantages in their design. By combining the two devices, they compliment each other. The dump station provides an efficient means of delivering product to the product pump. The product pump provides an efficient means of discharging and transporting product from the dump station. The dump station gives the dust control needed when dumping powered product from a container and for the dust laden gas that discharges from the product pump vent. The product pump may be designed with a low overall height that permits the pump to be used with the dump station and to maintain a standard 36" height from the floor to the grating or dumping level.

I claim:

1. An apparatus for conveying comminuted materials comprising:
   a hopper having an inlet through which material to be conveyed may be deposited,
   a filter operable for inducing a flow of air across said hopper inlet to prevent airborne particles of material deposited in said hopper from escaping into the atmosphere,
   a pump defining a chamber for receiving material from said hopper,
   a valve for controlling the supply of said material from said hoppr to said pump chamber,
   means for injecting fluid under pressure into said pump chamber to flush material disposed therein through a pump outlet,
   a valve for controlling the supply of fluid to said pump chamber,
   means intercommunicating said pump chamber and said hopper adjacent an inlet of said filter for venting said pump chamber to said hopper,
   a valve for controlling the flow of fluid through said venting means, and
   control means operable to sequentially close said fluid supply valve while opening said material supply valve for supplying a batch of material from said hopper to said pump chamber, close said material supply valve and said vent valve while opening said fluid supply valve for flushing said batch of material out of said pump chamber through said pump outlet, and then open said vent valve after closing said fluid supply valve and maintaining said material supply valve closed for venting said pump chamber to said hopper whereby the pressure in said pump chamber is reduced to facilitate the gravity flow of material from said hopper to said pump chamber when said material supply valve is reopened during the next cycle of operation, and material entrained in the fluid vented from said pump chamber will be conveyed to said hopper and be subjected to the action of said filter.

2. An apparatus according to claim 1 wherein said means for injecting fluid under pressure into said pump chamber includes first means for injecting a stream of fluid into an upper region of said pump chamber and second means for injecting a stream of fluid into a lower region of said pump chamber.

3. An apparatus according to claim 2 including means for sequentially operating said first and second fluid injecting means.

4. An apparatus according to claim 1 including a check valve disposed in an outlet of said pump.

5. An apparatus according to claim 1 wherein said control means is operable to close said vent valve after said material supply valve is open and material has begun to flow into said pump chamber.

6. An apparatus according to claim 1 wherein said hopper inlet is upwardly opening and said filter inlet is downwardly opening communicating with said hopper and said hopper inlet whereby airborne particles of material deposited through said hopper inlet opening and particles of material entrained in fluid vented from said pump chamber will be drawn to said filter means and subsequently caused to be deposited in said hopper.

7. An apparatus according to claim 6 including a grate disposed across said hopper opening.

8. An apparatus according to claim 6 including removable means for closing said hopper inlet.

* * * * *